J. R. ALLAIS.
PACKER'S CUTTING IMPLEMENT.
APPLICATION FILED DEC. 16, 1914.
1,137,445.
Patented Apr. 27, 1915.
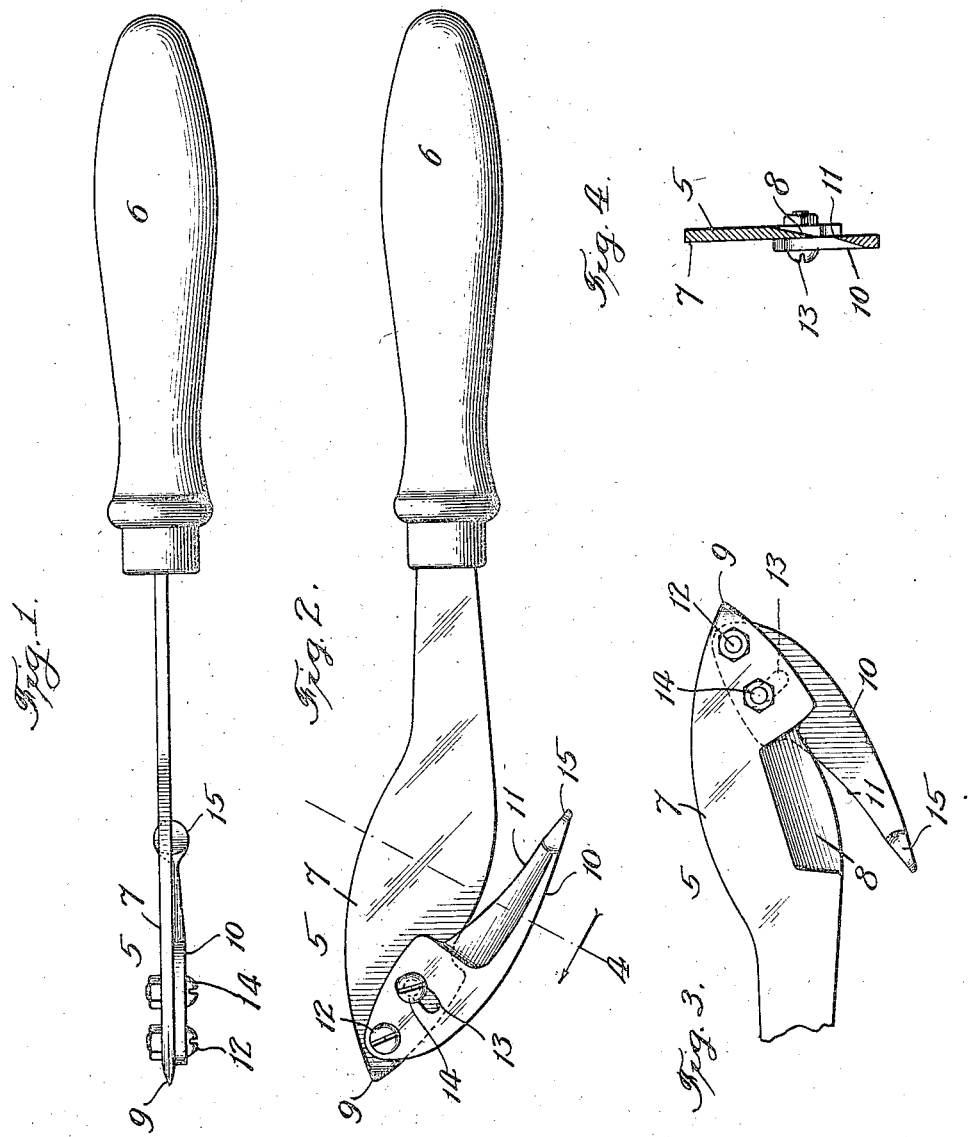

UNITED STATES PATENT OFFICE.

JOHN R. ALLAIS, OF CHICAGO, ILLINOIS, ASSIGNOR TO SEARS, ROEBUCK & CO., OF CHICAGO, ILLINOIS, A CORPORATION OF NEW YORK.

PACKER'S CUTTING IMPLEMENT.

1,137,445.

Specification of Letters Patent. Patented Apr. 27, 1915.

Application filed December 16, 1914. Serial No. 877,464.

*To all whom it may concern:*

Be it known that I, JOHN R. ALLAIS, a citizen of the United States, residing at Chicago, in the county of Cook and State of Illinois, have invented a new and useful Improvement in Packers' Cutting Implements, of which the following is a specification.

The primary object of my invention is to provide an implement for the use of packers of merchandise in packages tied for shipment (more particularly with cord or twine), which shall afford a safety-device against injury, of which there is liability, especially to the hands and fingers of the workers, in severing the tying medium where knives, shears, scissors, or the like, are employed for the purpose.

In one establishment known to me, employing several hundred such packers, it is found that the time lost in dressing the more or less slight injuries inflicted on the hands and fingers of the workers by the implements they customarily employ for severing the cord or twine, or by breaking the latter with the hands, amounts to the full working day of one employee. Such injuries and the loss of time they cause are wholly obviated by my device, illustrated in the accompanying drawing, in which—

Figure 1 shows the implement by a view presenting the cutting end edgewise; Fig. 2 shows the same but presents a face view of the cutting members; Fig. 3 presents to view the side of the cutting members opposite that shown in Fig. 2, and Fig. 4 is a section on line 4, Fig. 2.

A blade 5 provided with a handle 6 expands into a head portion 7, of the preferred generally oval shape illustrated, having a cutting edge at 8 and extending at an angle or being slightly offset relatively to the line of the handle. The extremity of this head is shown to be formed into a pointed cutter 9 for cutting into strips sheet-material, such as corrugated or other paper board, used in packing merchandise. A curved blade 10 is provided with a cutting edge at 11 to coöperate with that on the head 5. The blade 10, in use, extends rigidly from the head, but it is shown to be pivotally connected at 12 with the latter by a set-screw to adapt it to be adjusted, for the purpose hereinafter explained, and guided in its adjustment, at a slot 13, by a set-screw 14. The blade 10 terminates at its rear end in a button-like head 15 serving the purposes of guiding the insertion between the blades of the loose ends of a tied string to be severed and of blunting the end to prevent it from lacerating the person using the implement and of puncturing and tearing a parcel or package which may be accidentally encountered by that end.

To apply the implement in severing the free ends of a cord tied about a package, which is the purpose for which I have more particularly devised it, the user holds the ends in one hand and draws the blades 7 and 11 backwardly across the same to sever them in the apex of the coöperating cutting edges. As the cutting-edges, adjacent to the apex they form, become dulled with the use, the apex is changed to produce it with fresh sections of the cutting-edges by loosening the set-screws 12 and 14, turning the blade 10 to a more or less slight extent on the pivot 12 toward the edge 8, and re-fastening the adjustable blade to secure it rigidly in its coöperating relation to the head 7.

While the drawing illustrates the implement in the form believed to afford the best embodiment of my invention, I realize that considerable variation is possible in the details specifically shown and described, and I do not intend to be understood as limiting my invention to such specific or preferred embodiment.

What I claim as new and desire to secure by Letters Patent is—

A cutting-implement of the character described comprising a handle equipped head of approximately oval-form slightly offset relatively to the line of the handle and provided with a cutting edge, and a companion blade provided with a cutting edge and pivotally and separably fastened at its outer end to the outer end of the head and extending rearwardly, the said companion blade being provided with a slot in the rear of said pivotal connection, whereby said companion blade may be positioned relative to said first named blade with its cutting edge in apex forming relation thereto or in longitudinally extending relation therewith or bodily separated therefrom, said companion blade being provided at the inner end of its cutting edge with a button-like blunting head, and means for holding said blades in adjusted position.

JOHN R. ALLAIS.

In presence of—
 A. C. FISCHER,
 F. M. RONDEAU.